(12) United States Patent
Dey et al.

(10) Patent No.: US 9,686,136 B1
(45) Date of Patent: Jun. 20, 2017

(54) ASSEMBLY AND METHOD FOR CALIBRATING A SENSOR ON A WEARABLE DEVICE

(71) Applicants: Saikat Dey, Birmingham, MI (US); Gerrit Reepmeyer, Novi, MI (US); Anupam Sengupta, Troy, MI (US); Mikhail Zhavoronkov, Northville, MI (US); Senni Perumal, Southfield, MI (US); Steven Friedman, Concord, CA (US)

(72) Inventors: Saikat Dey, Birmingham, MI (US); Gerrit Reepmeyer, Novi, MI (US); Anupam Sengupta, Troy, MI (US); Mikhail Zhavoronkov, Northville, MI (US); Senni Perumal, Southfield, MI (US); Steven Friedman, Concord, CA (US)

(73) Assignee: Guardhat, Inc., Southfield, MI (US)

( * ) Notice: Subject to any disclaimer, the term of this patent is extended or adjusted under 35 U.S.C. 154(b) by 0 days.

(21) Appl. No.: 15/097,833

(22) Filed: Apr. 13, 2016

(51) Int. Cl.
| | |
|---|---|
| *H04L 5/16* | (2006.01) |
| *H04L 12/24* | (2006.01) |
| *H04B 1/3827* | (2015.01) |
| *H04W 4/00* | (2009.01) |
| *H04L 12/26* | (2006.01) |

(52) U.S. Cl.
CPC .......... *H04L 41/082* (2013.01); *H04B 1/385* (2013.01); *H04L 43/16* (2013.01); *H04W 4/005* (2013.01)

(58) Field of Classification Search
CPC ...... H04N 5/2327; A61B 5/11; A61B 5/14532
USPC ................................. 375/219, 224; 600/587
See application file for complete search history.

(56) References Cited

U.S. PATENT DOCUMENTS

| | | | | |
|---|---|---|---|---|
| 2013/0117707 A1* | 5/2013 | Wheeler | ................. | G06F 3/012 715/784 |
| 2013/0303946 A1* | 11/2013 | Gettens | .................... | A61B 5/11 600/587 |
| 2016/0173749 A1* | 6/2016 | Dallas | ................. | H04N 5/2352 348/208.6 |

* cited by examiner

*Primary Examiner* — Khai Tran
(74) *Attorney, Agent, or Firm* — Simonelli IP, PLLC

(57) ABSTRACT

A method calibrates a sensor for a defined parameter using a calibration station adapted to receive the sensor while it is secured to a wearable device. The calibration station includes a device to close the space surrounding the sensor to control the space. A quantity of an element being measured/calibrated is injected into the space. The quantity of the element is then measured by the sensor. A measured signal is transmitted to the calibration station. The measured signal is compared to a predetermined level. The method identifies when the measured signal differs from the predetermined level by a threshold amount and indicates or adjusts the sensor, depending on the application.

7 Claims, 6 Drawing Sheets

ASSEMBLY AND METHOD FOR CALIBRATING A SENSOR ON A WEARABLE DEVICE

BACKGROUND ART

1. Field of the Invention

The invention relates generally to the field of 'smart' safety gear. More particularly, the invention relates to calibration method for environmental sensors attached to a 'smart' wearable device.

2. Description of the Related Art

Environmental sensors require periodical performance calibration in order to reconfirm or reestablish their measurement accuracy. Calibration is necessary because most sensors tend to have some zero drift over time in either the positive or negative direction. This zero drift of the sensor readings over time may be compensated for or adjusted by periodic zero calibrations utilizing a known calibration quantity of an element. A similar problem exists with respect to the sensor span signal. Environmental sensors also have a tendency to slowly lose sensitivity with time, so that the span, or range of response from the zero baseline response for a given concentration, decreases over the useful life of the sensor. This loss of sensitivity may similarly be corrected for or adjusted by periodic span calibrations of the sensor circuitry utilizing a predetermined quantity of an element, in order to establish a desired proportionality between the measured signal and the quantity of an element monitored by the sensor device.

Today there are many methods and devices for calibration of static and portable sensors. However, conventional calibration systems are not designed to accommodate calibration of sensors attached to 'smart' wearable devices. An object of the present invention to provide improved methods for calibration using stationary or portable calibration device adapted to receive the sensor while it is secured to a 'smart' wearable device such as 'smart' hardhat, as well as utilize connected property of the said 'smart' devices to make calibration process easier and improve measurement accuracy.

SUMMARY OF THE INVENTION

A method calibrates a sensor for a defined parameter using a calibration station adapted to receive the sensor while it is secured to a wearable device. The method starts by closing a space surrounding the sensor to control the space. Once controlled, a quantity of an element is presented into the space. The quantity of the element is measured by the sensor and a measured signal is created based on that quantity measured. The measured signal is transmitted to the calibration station. The measured signal is then compared to a predetermined level. The method then identifies when the measured signal differs from the predetermined level by a threshold amount.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
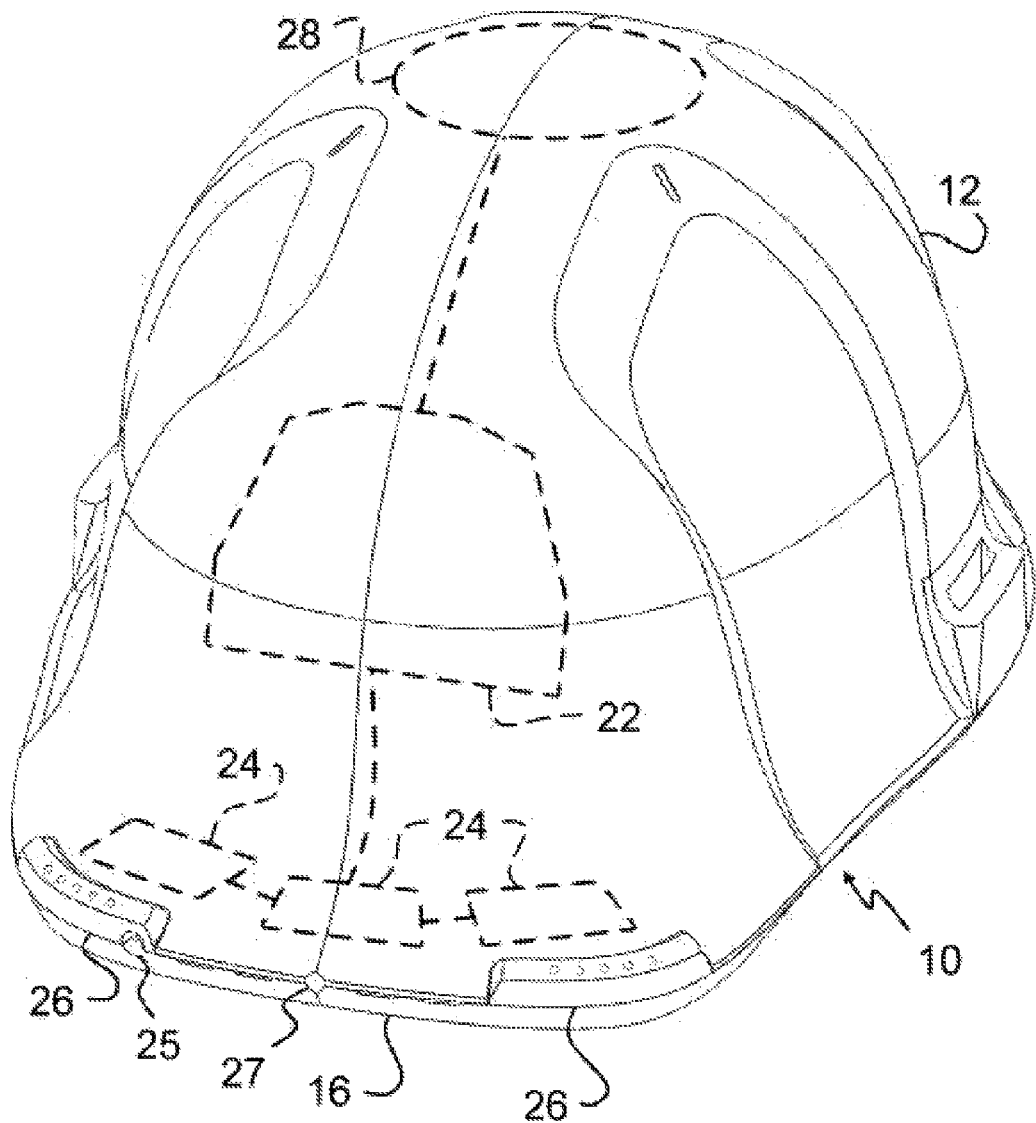
FIG. 1 a perspective view of a smart hardhat with an environmental sensor assembly and a communication unit attached thereto.

Referring to FIG. 1, a smart device is generally shown at 10. While the smart device 10 is shown to be a hard hat, it should be appreciated by those skilled in the art that the smart device 10 may be any device that has a level of connectivity and computational capability.

The hard hat 10 has a hard outer shell 12 designed to cover and protect a head of the person wearing the hard hat 10. The hard hat 10 defines an opening 14 (best seen in FIG. 2) to receive the head therein. A brim 16 extends out and away from the outer shell 12 over the portion of the hard hat 10 designed to be over the face of the person wearing it.

Figure 2:
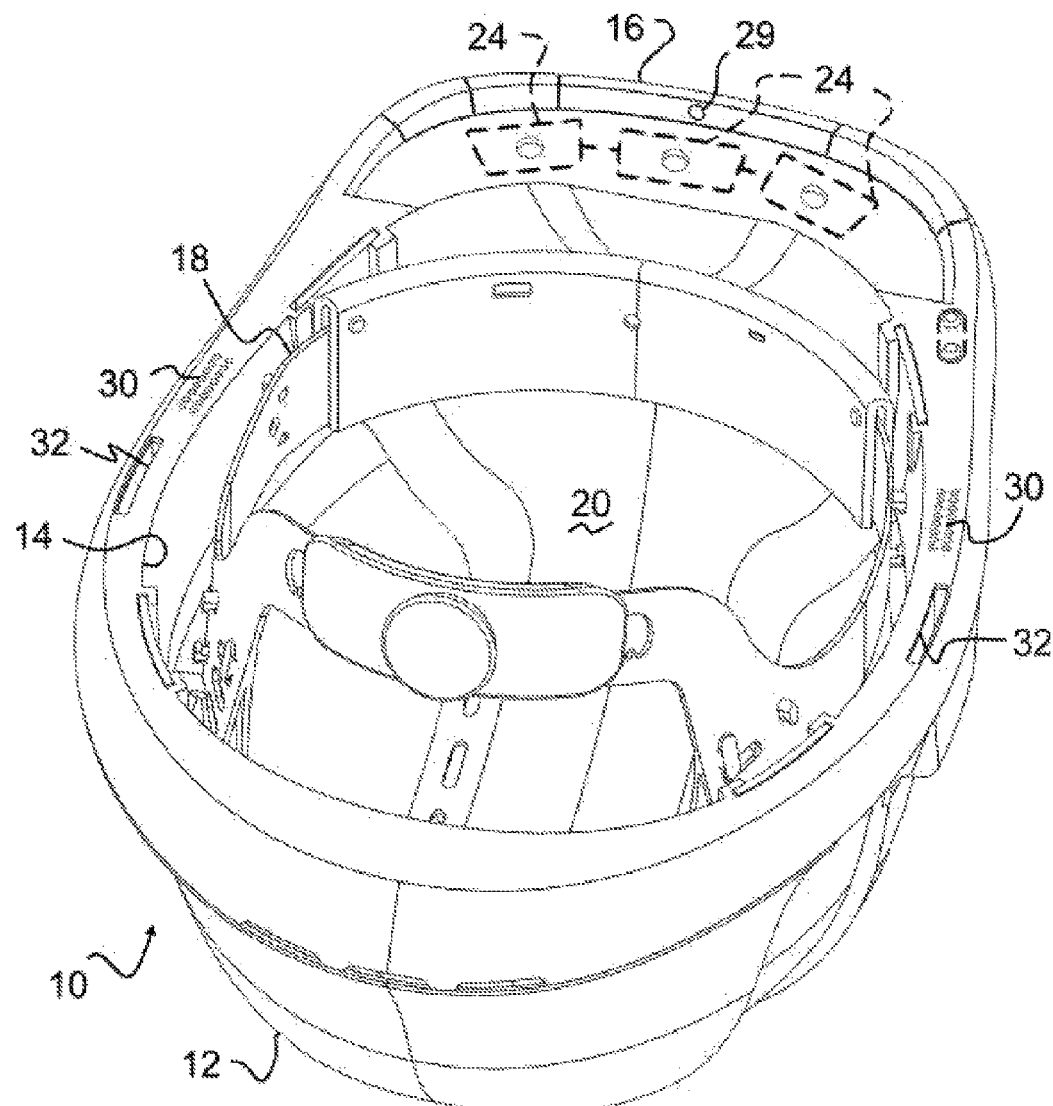
FIG. 2 a bottom view of the smart hardhat of FIG. 1.

Referring to FIG. 2, an adjustable suspension band 18 extends around the interior 20 of the hard hat 10 to assist in fitting the hard hat 10 to the head securely and comfortably. The adjustable suspension band 18 also absorb energy from impacts and collisions.

Now referring to both FIGS. 1 and 2, the hard hat 10 includes a control unit 22. The control unit 22 is secured to the outer shell 12 and includes electronics to receive and transmit signals and memory to store signals and/or data received by sensors 24. While three sensors 24 are show at or near the brim 16, it should be appreciated by those skilled in the art that there may be fewer or more sensors 24 at the brim 16. Additionally, there may be other sensors (not shown) located at locations other than at the brim 16.

Two handle grips 26 are also located at or near the brim 16. In the embodiment shown, the brim includes a light 25 and a camera 27. The light 25 may illuminate the path in front of the user or it may be used to assist the camera 27 in recording information. As best seen in FIG. 2, a communication light or wave guide 29 is directed inwardly to illuminate in the peripheral vision of the user to indicate information to the user. The communication light 29 may emit light from different wavelengths (colors) or it may intermittently illuminate to send signals to the user. The sensors 24, the light 25, the camera 27, and the communication light 29 are electrically connected to the control unit 22.

Also electrically connected to the control unit 22 is a communications unit 28. The communications unit 28 includes one or more antennae that transmit and receive signals to and from locations remote of the hard hat 10. One or more electronic communication protocols may be employed by the communications unit 28 depending on the needs of the person wearing the hard hat 10 and the functionality incorporated into the overall electronics of the hard hat 10.

With specific reference to FIG. 2, ports 30 for audible signals are positioned on the sides of the hard hat 10 at the opening 14. Small speakers (not shown) are housed within the outer shell 12 and produce sound waves that are emitted out the audio ports 30. Connection assemblies 32 are disposed adjacent the audio ports 30 and allow peripheral devices (none shown) to be secured to the hard hat 10. The connection assemblies 32 are described in greater detail in U.S. patent application Ser. No. 15/087,972, the disclosure of which is expressly incorporated herein by reference.

Figure 3:
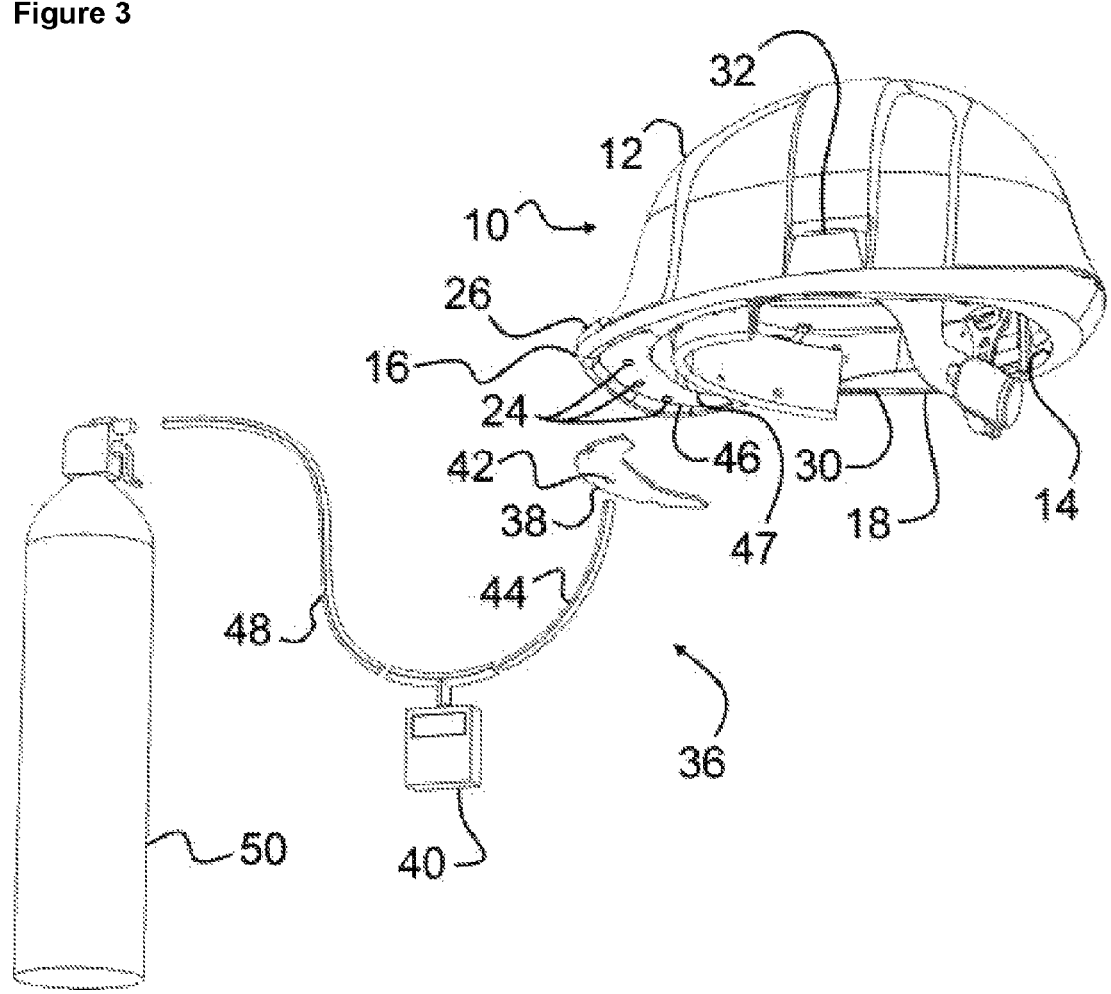
FIG. 3 an exploded perspective view of a portable calibration station adapted to be secured to the hardhat.

Referring to FIG. 3, one embodiment of the invention is shown at 36. The invention is a calibration assembly 36 that calibrates the sensors 24. The calibration assembly 36 is shown as a mobile assembly in FIG. 3. The calibration assembly 36 includes an enclosing structure 38 and a calibrator 40. In the portable version of the calibration assembly 36 shown in FIG. 3, the enclosing structure 38 is a plate that has an opening 42 designed to receive a calibration tube 44 thereon. The enclosing structure 38 is fitted to an underside 46 of the brim 16 and secured to the hard hat 10 during the calibration of the sensors 24. When secured to the underside 46 of the brim 16, the enclosing structure 38 and the underside 46 define a calibration space 47.

The calibrator 40 receives an element (in this example, a gas) through a gas supply tube 48, which receives a gas from a canister 50. The gas used as a control in the calibration of the sensors 24 could include carbon monoxide, hydrogen-sulfide, methane, nitrous oxide, carbon dioxide, smoke, and the like.

It should be appreciated by those skilled in the art that the sensor 24 being tested may measure a non-gas element, such as light. In such a situation, the canister 50 would be replaced with a light source and the gas supply 48 and calibration 44 tubes would be replaced with wave guides or fiber optics. This alternative description is not intended to be limiting as there may be other elements that will be measurable using the calibration assembly 36.

Figure 4:
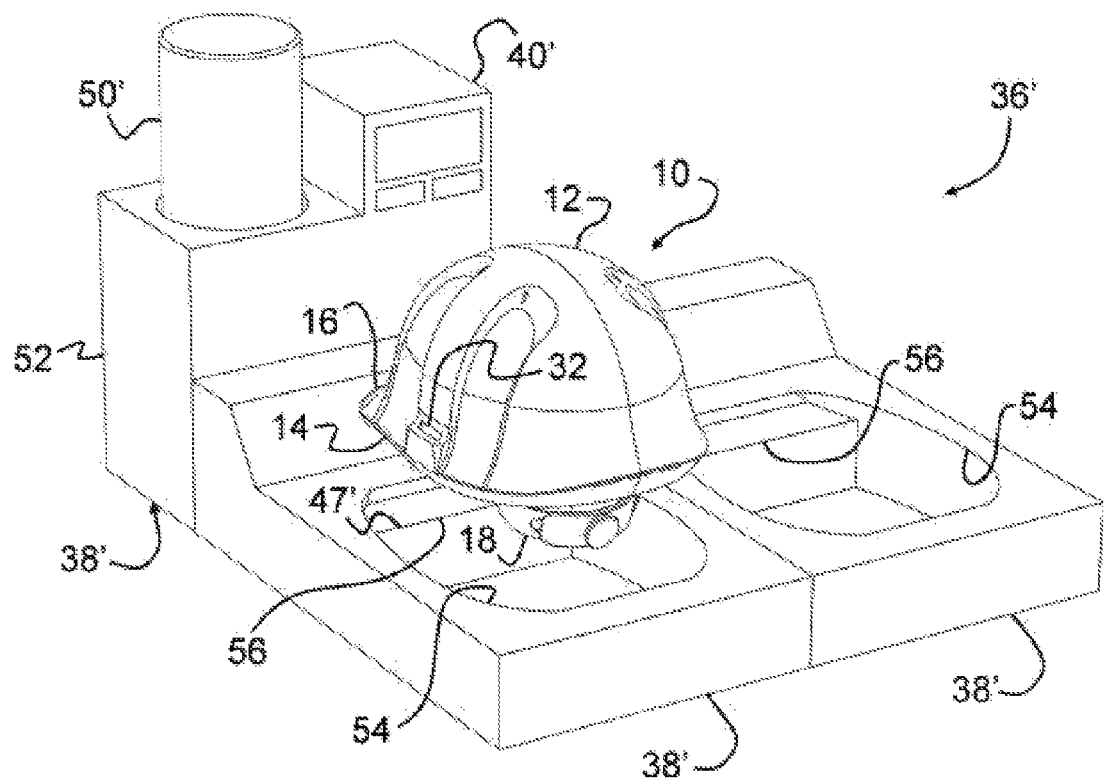
FIG. 4 a perspective view of a fixed calibration station adapted to receive a hardhat thereon.

Referring to FIG. 4, wherein like primed reference numerals represent similar elements as those shown in FIG. 3, a tabletop version of the calibration assembly 36' is shown. The tabletop version of the calibration assembly 38' includes a station 52. The canister 50' is secured within the station 52. The calibrator 40' is also housed within the station 52.

The station 52 includes may include one or more enclosure structures 38'. Each of the enclosure structures 38' includes a bay 54 for receiving a hard hat 10 therein. The bay 54 may be designed to calibrate sensors 24 regardless of whether the sensors 24 are located on the underside 46 of the brim 16 or somewhere else in the interior of the outer shell 12. In case the sensors 24 being calibrated are located on the underside 46 of the brim 16, a shelf 56 helps limit the calibration space adjacent the sensors 24.

Figure 5:
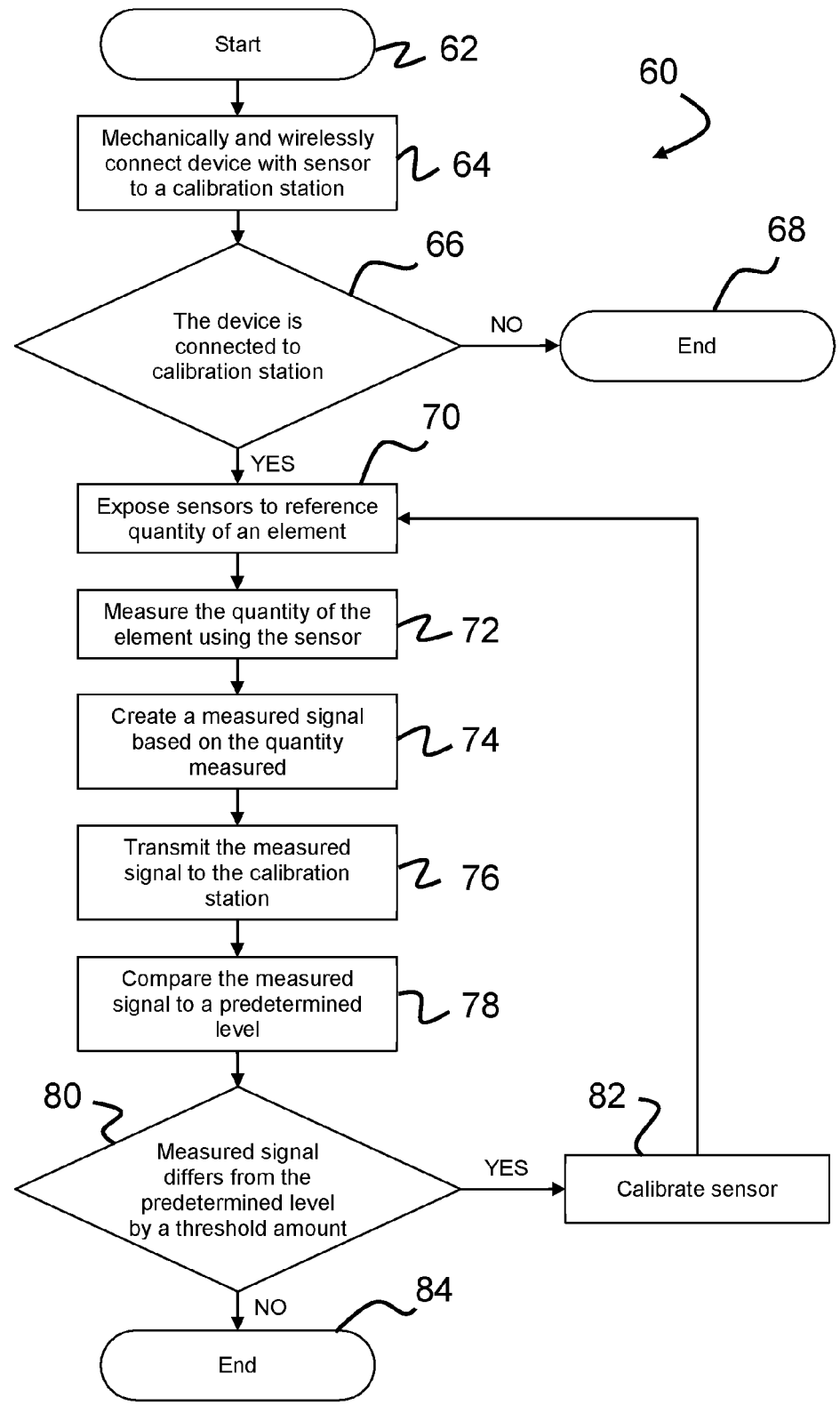
FIG. 5 is a flow chart showing one method of the invention.

Referring to FIG. 5, one embodiment of the inventive method of calibrating a sensor 24 secured to a hard hat 10 is generally shown at 60. The method 60 calibrates a sensor 24 for a defined parameter using a calibration assembly 36 adapted to receive the sensor 24 while it is secured to the hard hat 10.

The method begins at 62. The method mechanically and wirelessly connects the hard hat 10 with a sensor 24 to the calibration assembly 36, 36' at 64. By mechanically securing the hard hat 10 to the calibration assembly 36, 36', a calibration space 47, 47' is created. The calibration space 47, 47' surrounds the sensor 24 to control the environment of which the sensor 24 will be sensing.

Once the hard hat 10 is mechanically connected at 66 to the calibration assembly 36, 36' to create the calibration space 47, 47', a quantity of an element to be used for calibration is presented into the calibration space 47, 47'. As stated above, this could be done by injecting a gas into the calibration space 47, 47' or it could be done differently should a non-gaseous element sensor be deemed necessary to calibrate. It will not matter what the sensor 24 is being calibrated as long as the calibration space 47, 47' is created to control the element being introduced into the space adjacent the sensor 24.

Whether the calibration assembly 36, 36' is mechanically or physically connected to the hard hat 10 or not, the hard hat 10 is wirelessly connected to the calibration assembly 36, 36' during the connection step 66. The measured signal from a hard hat 10 is transmitted to the calibration assembly 36, 36' to compare and calibrate the settings for sensors 24 on the hard hat 10.

If the hard hat 10 is not able to mechanically and wirelessly connect to the calibration assembly 36, 36' at 66, the method is terminated at 68. If it is mechanically connected, a quantity of the element is introduced into the calibration space 47, 47' to expose the sensors 24 to a reference amount or quantity of the element at 70.

The quantity of the element introduced into the calibration space 47, 47' is then measured at 72. A measured signal is created based on the quantity measured at 74. The measured signal is then transmitted to the calibration assembly 36, 36' at 76. Once received, the measured signal is compared against a predetermined level at 78. If at 80, the measured signal differs from the predetermined level by a threshold amount, the predetermined level of the sensor 24 is calibrated at 82. The loop back after step 82 is done iteratively to create multiple data points for the calibration process. If the measured signal does not differ from the predetermined level by the threshold amount, the sensor 24 does not need to be calibrated and the method terminates at 84.

If the measured signal does differ from the predetermined signal by the threshold amount an alert is activated to let the person or system testing the sensors 24 know that a calibration is required. Additionally, the calibration assembly 36, 36' will be able to read specific user parameters stored within the control unit 22 of the hard hat 10 in case one user has a heightened sensitivity to a particular element and the threshold level must be adjusted for that particular user.

Figure 6:
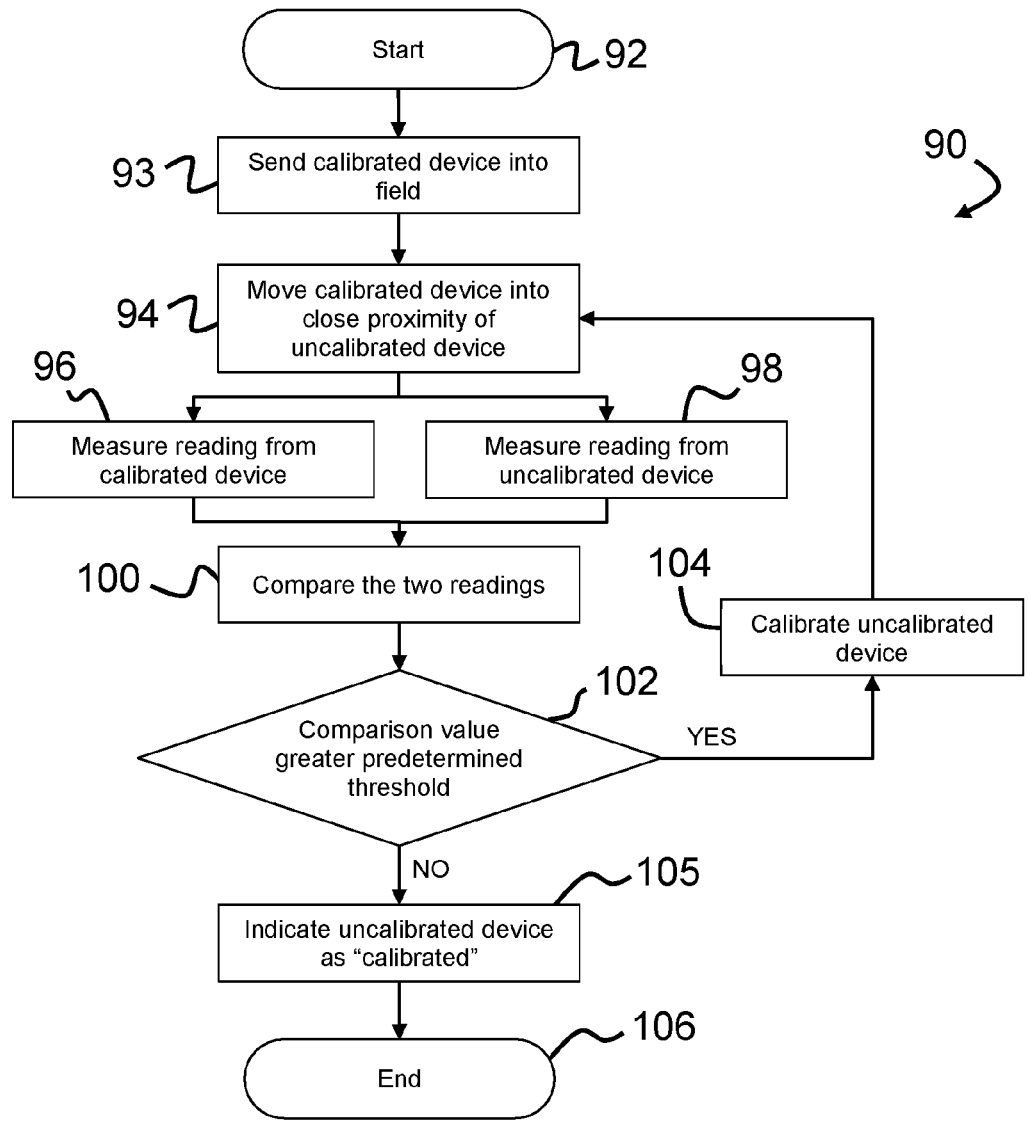
FIG. 6 is a flow chart showing another method of the invention for calibrating a plurality of remote smart devices using another smart devices as reference point.

Referring to FIG. 6, depending on the deployment of the calibration assembly 36, 36', signals from other hard hats 10 may be incorporated into the calibration method. This method, generally shown at 90, begins at 92. A calibrated hard hat 10 is sent into the field at 93. While in the field, the calibrated hard hat 10 is moved into close proximity of an uncalibrated hard hat 10 at 94. A measurement is taken from the calibrated hard hat 10 at 96 and a measurement is taken from the uncalibrated hard hat 10 at 98.

The two readings are then compared at 100. The compared value is then measured against a predetermined threshold at 102. If the comparison value is greater than the predetermined value, the uncalibrated hard hat 10 is calibrated right there in the field at 104. The uncalibrated hard hat 10 does not have to be returned to the calibration station 36, 36' and can be calibrated either in the field or it can be returned to the calibration stations 36, 36' for calibration.

If the comparison value is not greater than a predetermined threshold, the status of the uncalibrated hard hat 10 is changed to calibrated at 105 so that it is not iteratively checked while it is deployed in the field. This status change may be timed out so that eventually it will be rechecked or sent back to a calibration station 36, 36' for a thorough or complete calibration independent of a calibrated hard hat 10. The method then terminates at 106. The method of FIG. 6 introduces the statistical/machine learning aspects into the calibration process, which allows the solution provided by FIG. 6 to adjust to real life variations in a dynamic manner.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for calibrating a device for a defined parameter using a calibration station adapted to receive the device while it is secured to a wearable device, the method comprising the steps of:
    closing a space surrounding the device to control the space;
    presenting a quantity of an element into the space;
    measuring the quantity of the element using the device;
    creating a measured signal based on the quantity measured;
    transmitting the measured signal to the calibration station;
    comparing the measured signal to a predetermined level; and
    identifying when the measured signal differs from the predetermined level by a threshold amount.

2. A method as set forth in claim 1 including a step of calibrating the device if the measuring signal differs from the predetermined signal by the predetermined threshold.

3. A method as set forth in claim 1 including a step of activating an alert when the measuring signal differs from the predetermined signal by the predetermined threshold.

4. A method as set forth in claim 1 wherein the predetermined level is adjusted based on the user wearing the wearable device.

5. A method as set forth in claim 1 wherein the predetermined level is adjusted based on readings collected from other devices secured to other wearable devices.

6. A method for calibrating a plurality of devices for a defined parameter using a calibration station, wherein a portion of the plurality of devices is located remote of the calibration station, the method comprising the steps of:
    calibrating a device local to the calibration station to create a calibrated device;
    moving the calibrated device away from the calibration station and adjacent a non-calibrated device located remotely from the calibration station;
    measuring a parameter using the calibrated device to create a calibrated reading;
    measuring the parameter using the non-calibrated device to create a non-calibrated reading;
    comparing the calibrated and non-calibrated readings to create a comparison value;
    calibrating the non-calibrated device when the comparison value exceeds a predetermined value; and
    changing the status of the non-calibrated device to a calibrated device when the comparison value is less than the predetermined value.

7. A method as set forth in claim 6 including providing instructions to replace each predetermined level stored in each of the portion of the plurality of devices located remote of the calibration station.

* * * * *